Aug. 28, 1956 I. S. LEE 2,760,283
ROCK PULLING DEVICE
Filed Jan. 15, 1952 2 Sheets-Sheet 1

INVENTOR.
INGFRED S. LEE
BY
ATTORNEY

Aug. 28, 1956     I. S. LEE     2,760,283
ROCK PULLING DEVICE

Filed Jan. 15, 1952     2 Sheets-Sheet 2

INVENTOR.
INGFRED S. LEE
BY
ATTORNEY

United States Patent Office 2,760,283
Patented Aug. 28, 1956

2,760,283

ROCK PULLING DEVICE

Ingfred S. Lee, Gilbey, N. Dak.

Application January 15, 1952, Serial No. 266,585

4 Claims. (Cl. 37—2)

This invention relates to rock pulling devices and more particularly to a special purpose machine adapted for ready attachment to a tractor or similar vehicle so as to provide a device which is easily transportable to facilitate its use in fields or other places.

The primary object of the present invention resides in the provision of a new and improved rock pulling device comprising a two wheeled vehicle including a frame having a draft connection at its forward end for attachment to a tractor, a pair of laterally spaced earth penetrating rock engaging tines at the rearward end of the frame and supporting wheels adjustably mounted on the frame for selective positioning to serve either as a means on which the device may be transported or as a means for applying lifting power to the embedded rock engaging tines to pull the rock from the earth.

Another object of the invention resides in the provision of a new and improved rock pulling device including a pair of laterally spaced earth penetrating rock engaging tines arranged in a manner to provide a forked, or two point contact, with the rock to more effectively utilize the lifting force applied to the tines to dislodge and pull the rock from its embedded position in the ground.

Another object of the invention resides in the provision in a rock pulling device of a frame including a pair of longitudinally arranged members disposed in spaced relationship having a draft connection at their forward ends and having their rearward ends turned downwardly and forwardly to form sharpened ground penetrating tines cooperating to provide a forked engagement with a rock to be pulled from its embedded position in the ground.

Another object of the invention lies in the provision in a rock pulling device of loading means operative to effectively increase the ground penetrating action of the rock contacting tines as the device is moved into rock pulling position.

Another object of the invention resides in the provision in a rock pulling device of a crank axle carrying supporting and pressure exerting wheels on its extremities and having its intermediate portion journaled for partial rotation on the frame of the device adjacent the ground penetrating rock engaging tines and the provision of power operated means for effecting the partial rotation of the crank axle to alter the elevation of the rearward portion of the frame of the device and selectively place the wheels in one of several positions in accordance with the instant requirement of the work at hand. One of these several positions raises the points of the tines above ground level to permit the ready transporting of the device; another position raises the wheels from contact with the ground and permits the device to rest upon the points of the tines; and still another position, assumed after the tines have been embedded in rock contacting position, places the wheels in pressure contact with the ground to afford the lifting force on the rock contacting tines to pull the rock from its embedded position in the ground.

A more specific object of the invention resides in the adjustable positioning of the loading means, located above the tines, to alter the weight applied thereto in accordance with the particular ground conditions encountered at the time the device is being used.

Another specific object of the invention lies in the fabrication of a unitary frame structure from a plurality of parts including a pair of longitudinally arranged members having their rearward portions disposed in spaced relationship and turned downwardly and forwardly to form laterally spaced ground penetrating rock contacting tines cooperating to provide a forked engagement with the embedded rock to be pulled.

A further object of the invention is to produce a simple, sturdy and effective rock pulling device which is readily transportable, easy to use and relatively inexpensive to manufacture.

Other objects and advantages of the present invention will become apparent from the following description of an illustrative embodiment of a rock pulling device constructed in accordance with the teachings of the invention.

Figure 3:
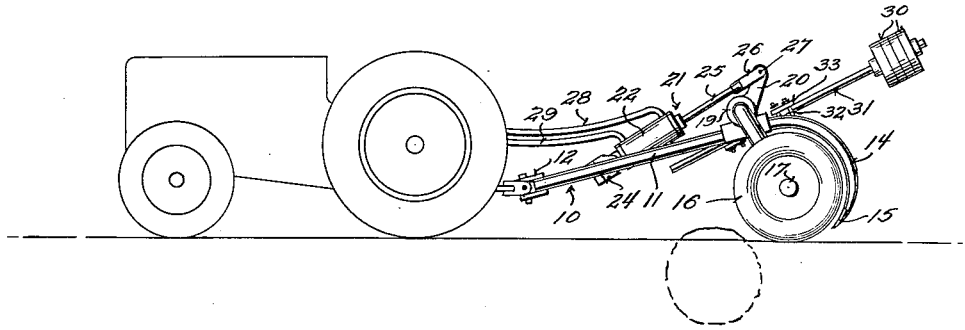
Fig. 3 is a side elevational view of the rock pulling device attached to a tractor and properly positioned to begin the operation of pulling the embedded rock.
Figure 4:
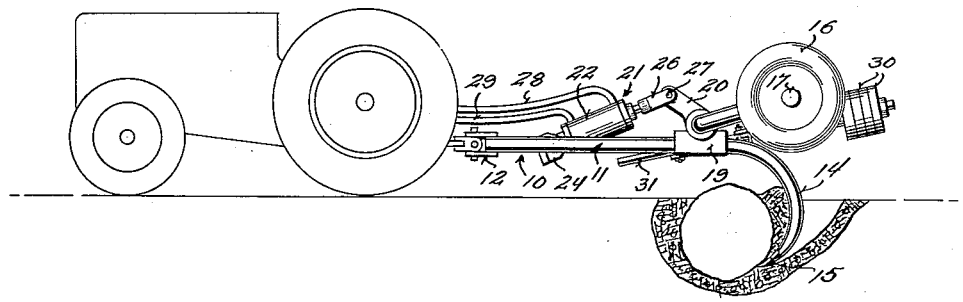
Figure 5:
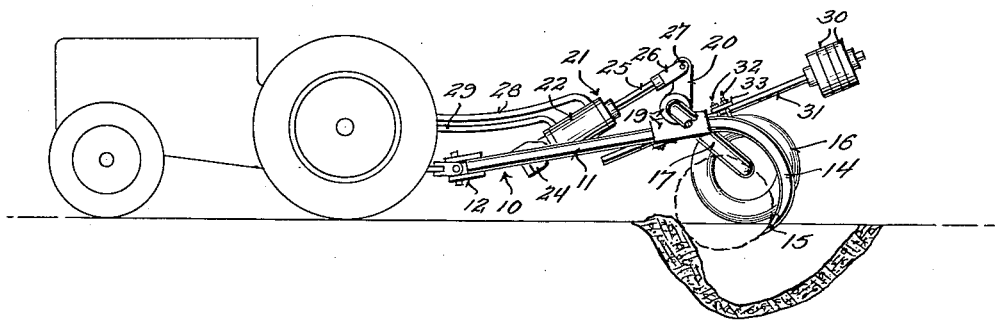

Fig. 4 is a view similar to that shown in Fig. 3 with the supporting wheels swung to inactive position, out of contact with the ground, and the tractor moved forward a sufficient distance to effect the embedded contact of the ground penetrating tines with the rock to be pulled; and Fig. 5 is a view similar to Figs. 3 and 4 showing the wheels in pressure contact with the surface of the ground and exerting a lifting force on the rock contacting tines to effect the raising or pulling of the rock from its embedded position in the ground.

The rock pulling device, chosen for illustrative purposes in the accompanying drawing, constructed in accordance with the teachings of the present invention comprises a frame 10 including a pair of longitudinally arranged members 11, preferably tubular in form, having their forward ends connected to support a draw bar attachment 12 with the remainder of their lengths disposed in substantially parallel spaced relationship by means of suitable cross or brace members 13, which are preferably welded in place to provide a unitary structure affording considerable strength for its weight. The rearward ends of the members 11 are bent downwardly and forwardly to form ground penetrating rock contacting tines 14, preferably provided at their sharpened ends with replaceable hardened steel points 15.

The rearward portion of the frame 10 is normally supported by a pair of wheels 16 rotatably mounted adjacent the extremities of a crank axle 17 having an offset central portion 18 journaled for partial rotation in a pair of aligned bearings 19 secured to the frame members 11 adjacent the top of the tines 14. An operating arm 20 is fixedly mounted, at the proper angle, on the central offset portion 18 of the crank axle 17 between the bearings 19. The arm 20 serves as a means for altering the angular position of the crank axle 17 in the bearings 19 to thereby effect a relative change of position of the wheels 16 with respect to the ground penetrating tines 14.

The power means for effecting movement of the operating arm 20, chosen for illustrative purposes in the drawing, comprises a hydraulic ram or jack 21 including a cylinder 22 having one end pivotally mounted on a pin 23 carried by a mounting bracket 24 which is attached to the forward cross brace 13 in alignment with the operating arm 20. The cylinder 22 houses a piston provided with a rod 25 projecting from the free end of the cylinder and carrying a yoke 26 adapted for attachment to the free end of the operating arm 20 by the application of a pivot pin 27. Fluid for effecting movement of the piston within the cylinder 22 is directed to and from the cylinder through suitable conduits 28 and 29, preferably formed of flexible tubing, coupled in any approved manner to fittings disposed adjacent the respective ends of the cylinder. Any conventional pump and valve means (neither of which is shown) may be located on the tractor to afford conveniently positioned means for supplying and controlling the flow of fluid to and from the cylinder 22.

To facilitate more effective penetration of the tines 14, into the ground, loading means is provided for the rearward end of the frame 10. In the present instance, the loading means comprises a plurality of weight discs 30 adapted for removable application to the rearwardly projecting or overhanging end of a weight supporting bar 31 having its forward portion releasably retained in desired position of axial adjustment on an adjacent pair of cross braces 13 by means of U-bolts 32 and clamping plates 33.

Figure 1:
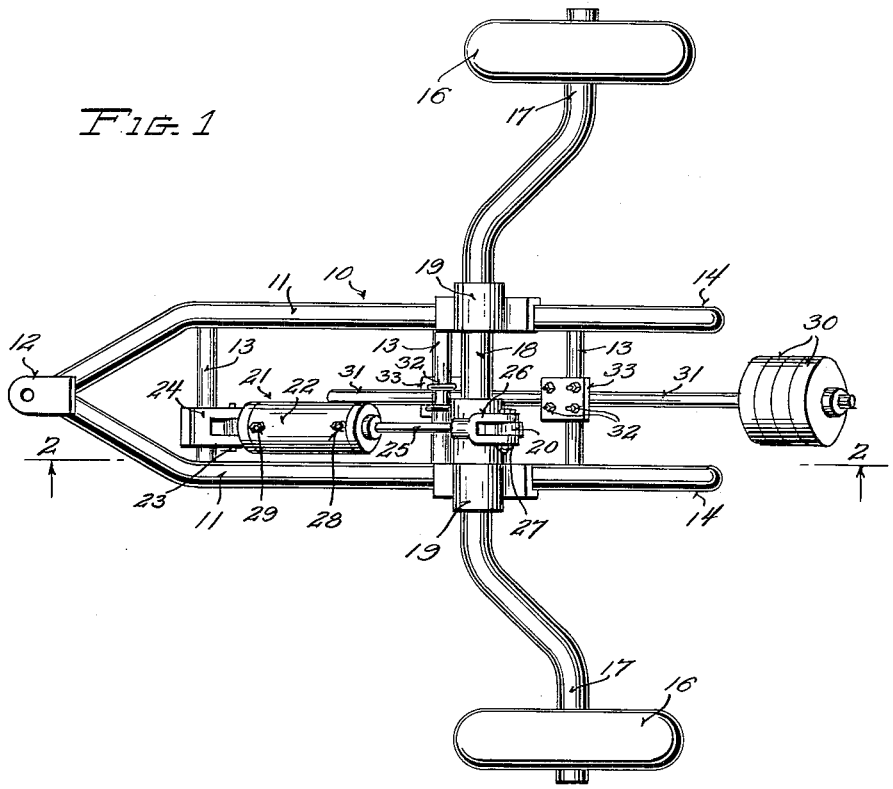
Figure 1 is a top plan view of a rock pulling device constructed in accordance with the teachings of the present invention.
Figure 2:
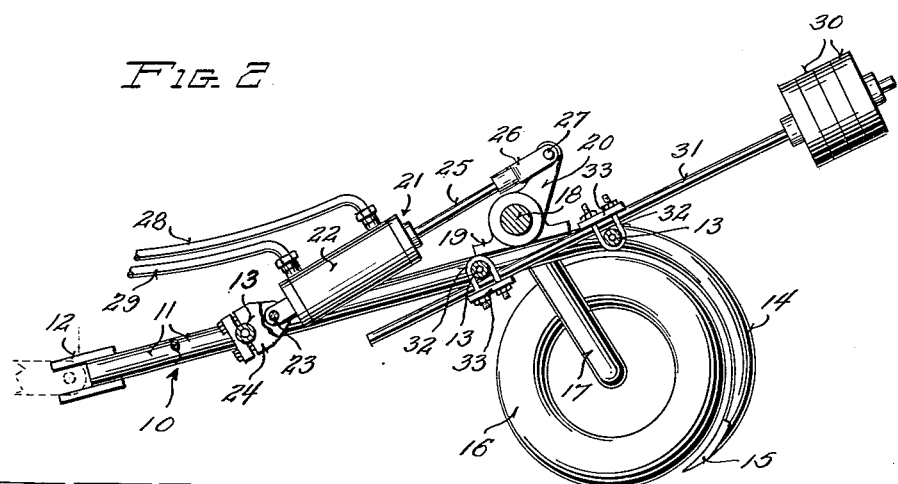
Fig. 2 is a vertical longitudinal sectional view, taken on the line 2—2 of Fig. 1, showing the device in transportable position with the draft connection to a tractor appearing in dotted lines.

A brief description of the operation of the device will serve to emphasize its simplicity and its numerous advantages. The draw bar attachment member 12, carried at the forward end of the frame 10 of the rock pulling device, is secured to the draw bar of a tractor or other vehicle by means of any conventional coupling device. With the frame supporting wheels in the position shown in Figs. 2 and 3, the device is ready to be transported to the field or other place where rocks are to be pulled. Figure 3 of the drawing shows the rock pulling device properly positioned to initiate pulling operations on the embedded rock indicated ahead of the tines 14. After the device has been properly located, the operator effects the lowering of the tines 14 into ground contacting position by manipulating the control valve to introduce fluid into the rear end of the cylinder 22 to effect the counterclockwise rotation of the offset portion 18 of the axle 17 in the bearing blocks 19 to cause the supporting wheels 16 to be swung upwardly and rearwardly out of contact with the ground. The tractor is then driven forwardly to cause the downwardly and forwardly projecting tips of the tines 14 to dig into the ground. The ground penetrating movement of the tines 14 is assisted by the effect of the weight 30 due to its overhanging position beyond the rear of the frame 10, with the result that the combined effect of the forward movement of the tractor and the downward thrust on the sharply pointed tines 14 causes them to reach a sufficient depth in the ground to engage the under side of the rock when they contact the same. With the device so positioned that the tines 14 are in contact with the rock to be pulled, the operator again manipulates the control valve to cause fluid under pressure to be fed into the forward end of the cylinder 22 to effect the clockwise rotation of the crank axle 17 and cause the wheels 16 to move downwardly and forwardly into pressure contact with the ground. Continued application of fluid in the forward end of the cylinder increases the pressure contact between the wheels 16 and the ground and this pressure is transmitted to the tines 14 through the axle 17, the bearings 19 and the frame 10 to produce a strong lifting force on the tines 14. The effect of this lifting force on the tines 14 results in the dislodging of the embedded rock and forward movement of the tractor will cause the freed rock to be elevated to the surface of the ground through its contact with the tines 14.

Having completed the general description of the structure and operation of the rock pulling device, applicant now desires to direct particular attention to the arrangement of certain parts of the device which combine to produce a simple, inexpensive and highly efficient rock pulling device. One of the principal features of the devices resides in the provision of a pair of laterally spaced ground penetrating tines which cooperate in a manner to provide a forked contact with the rock to be pulled. The advantages of this feature are both structural and functional. Structurally, the two point contact between the tines and the rock permits the use of lighter tines since the load on the tines is divided and functionally, the two point contact between the tines and the embedded rock affords an arrangement by which the lifting force is applied to the rock at spaced points to stabilize and balance the effective lifting force. Another important feature of the device resides in its structural simplicity in which the longitudinal frame members each include a downwardly and forwardly turned ground penetrating tine at one end thereof and a draft connection at the other ends thereof with the result that production costs are materially lessened not only due to the smaller number of required parts but also to the fact that costly machining operations are virtually eliminated.

From the foregoing description of an illustrative embodiment of the present invention, it will readily be understood that a simple inexpensive and highly effective rock pulling device has been provided which is readily transportable and which contains structural and functional features which include the provision of spaced ground penetrating tines which cooperate to form a forked rock contacting and lifting arrangement and the utilization of the frame supporting wheels as a means for transmitting a powerful lifting force to the rock contacting tines by which the rock is pulled from its embedded position in the ground.

While the invention has been described in considerable detail in the foregoing specification, it is to be understood that various changes may be made in its embodiment without departing from or sacrificing any of the advantages hereinafter claimed.

I claim:

1. A rock pulling device comprising a rigid frame including a pair of longitudinally arranged tubular members having their forward ends connected to support a draft hitch and having their rearward ends disposed in laterally spaced relationship and turned downwardly and forwardly to form a pair of arcuately shaped sharply pointed ground penetrating rock contacting tines, a rockably mounted wheeled support comprising a crank axle having an offset central portion journaled for rocking movement on said frame adjacent the top of said tines and a wheel mounted on each of the axially aligned laterally projecting outer extremities of said crank axle, power operated means secured to said frame and said wheeled support, a cross brace secured between the laterally spaced rearward portion of said rigid frame, a weight supporting bar attached to and projecting rearwardly from said cross brace, and weight means supported on the rearwardly projecting portion of said bar and disposed above said tines effective to facilitate the ground penetrating movement of said tines, said power operated means providing the motivating force for effecting the rocking movement of said wheeled support into pressure contact with the ground to transmit a lifting force upon said frame and said tines when the latter are in rock engaging position to pull the rock from its embedded position in the ground.

2. A rock pulling device, as set forth in claim 1, in which said power operated means is effective to alter the position of said wheeled support with respect to said frame and tines whereby said wheeled support may be selectively rendered operative or inoperative to support said frame and wherein said weight means become effective to facilitate the ground penetrating movement of said tines when said device is moved forwardly with said wheeled support in inoperative position.

3. A rock pulling device comprising a frame including a pair of longitudinally disposed tubular members having their forward ends joined to support a draft connection for attachment to a traction machine and having their rearward ends disposed in laterally spaced relationship and bent downwardly and forwardly to form a pair of arcuately shaped sharply pointed ground penetrating tines cooperating to provide a pair of laterally spaced contacts with an embedded rock, a rockably mounted wheeled support comprising a crank axle having an offset central portion journaled for rocking movement on said frame adjacent the top of said tines and a wheel mounted on each of the axially aligned laterally projecting outer extremities of said crank axle, and power operated means secured to said frame and said rockably mounted wheeled support, said power operated means providing the motivating force for effecting relative movement between the wheels of said support and said frame whereby said wheels may be elevated to a position above the ground to facilitate the penetration of said tines into rock contacting position upon forward movement of said frame and operative to effect movement of said wheels into pressure contact with the ground to transmit a lifting force upon said frame and said tines when the latter are in rock engaging position to provide a balanced load on said tines to pull the rock from its embedded position in the ground.

4. A rock pulling device comprising a frame including a pair of longitudinally disposed tubular members having their forward ends joined to support a draft connection for attachment to a traction machine and having their rearward ends disposed in laterally spaced relationship and bent downwardly and forwardly to form a pair of arcuately shaped sharply pointed ground penetrating tines cooperating to provide a pair of laterally spaced contacts with an embedded rock, a rockably mounted wheeled support comprising a crank axle having an offset central portion journaled for rocking movement on said frame adjacent the top of said tines and a wheel mounted on each of the axially aligned laterally projecting outer extremities of said crank axle, power operated means secured to said frame and said wheeled support for altering the position of said wheeled support with respect to said frame, a cross brace secured between the laterally spaced rearward portion of said frame, a weight supporting bar attached to and projecting rearwardly from said cross brace, and weight means adjustably positioned on the rearwardly projecting weight supporting bar and disposed above said tines, said weight means serving to facilitate the ground penetrating movement of said tines when said device is moved forwardly with said wheeled support in elevated position out of contact with the ground.

References Cited in the file of this patent

UNITED STATES PATENTS

| | | |
|---|---|---|
| 22,215 | Willmot | Nov. 30, 1858 |
| 799,258 | Paul | Sept. 12, 1905 |
| 851,732 | Deschambault | Apr. 30, 1907 |
| 1,676,040 | Meunier | July 3, 1928 |
| 1,844,124 | Jordan | Feb. 9, 1932 |
| 1,969,684 | Bird | Aug. 7, 1934 |
| 2,128,602 | Davenport | Aug. 30, 1938 |
| 2,310,526 | Horrigan | Feb. 9, 1943 |
| 2,475,146 | Le Tourneau | July 5, 1949 |
| 2,624,959 | Anderson | Jan. 13, 1953 |

FOREIGN PATENTS

| | | |
|---|---|---|
| 462,183 | Canada | Jan. 3, 1950 |